March 26, 1963

E. C. HERBKERSMAN 3,083,025

CHUCK WITH DETACHABLE GRIPPING JAW

Filed Oct. 25, 1961

INVENTOR.
EARLE C. HERBKERSMAN
BY
*John H. Leonard*
*his* ATTORNEY.

March 26, 1963 E. C. HERBKERSMAN 3,083,025
CHUCK WITH DETACHABLE GRIPPING JAW
Filed Oct. 25, 1961 4 Sheets-Sheet 2

INVENTOR.
EARLE C. HERBKERSMAN
BY
John H. Leonard,
his ATTORNEY.

March 26, 1963   E. C. HERBKERSMAN   3,083,025
CHUCK WITH DETACHABLE GRIPPING JAW
Filed Oct. 25, 1961   4 Sheets-Sheet 3
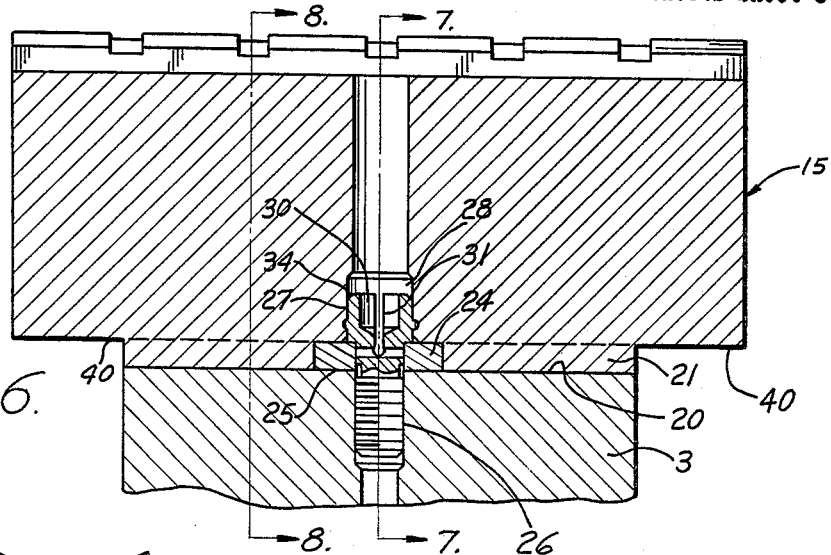
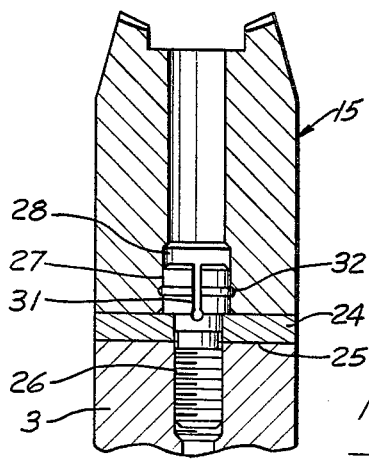
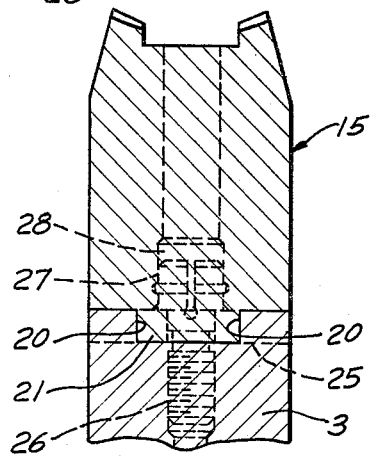
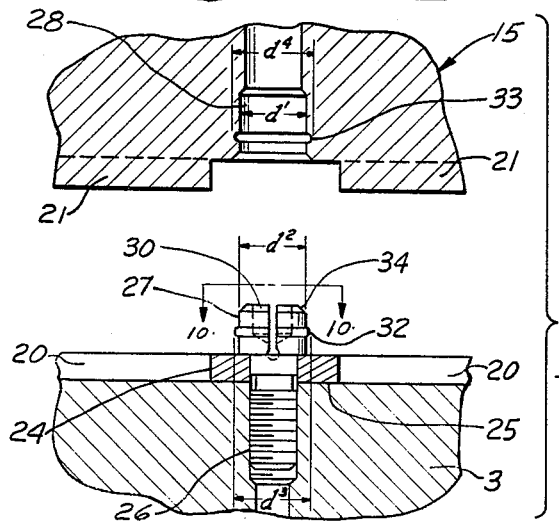
INVENTOR.
EARLE C. HERBKERSMAN
BY
his ATTORNEY.

March 26, 1963   E. C. HERBKERSMAN   3,083,025
CHUCK WITH DETACHABLE GRIPPING JAW
Filed Oct. 25, 1961   4 Sheets-Sheet 4

INVENTOR.
EARLE C. HERBKERSMAN
BY
his ATTORNEY.

United States Patent Office

3,083,025
Patented Mar. 26, 1963

3,083,025
CHUCK WITH DETACHABLE GRIPPING JAW
Earle C. Herbkersman, Parma, Ohio, assignor to The Pipe Machinery Company, Wickliffe, Ohio, a corporation of Ohio
Filed Oct. 25, 1961, Ser. No. 147,645
10 Claims. (Cl. 279—122)

This invention relates to a chuck jaw and chuck jaw carrier combination, and particularly to a chuck jaw and carrier combination in which the jaw carrier and jaw are readily detachable.

Heretofore, it has been common practice to provide chucks employing radially movable jaw carriers to which the gripping jaws are fastened, respectively, by suitable bolts or screws. These jaws are arranged to be moved by the carriers into and out of gripping relation with respect to a workpiece. Usually the jaws have gripping faces of a contour to fit the peripheral surfaces of workpieces within a certain limited range of diameters. If the workpieces have diameters out of the particular range, the jaws must be individually removed and replaced with jaws having gripping faces resigned to fit the different diameters. The removal of the jaws and their replacement is a relatively time consuming and expensive operation, particularly in the case of mass production with heavy duty chucks for gripping large diameter workpieces.

The present invention is directed to a chuck jaw carrier and jaw combination in which the jaws are readily detachable from their respective carriers.

More specifically, each jaw is connected to its carrier by snap fastening means which are so operable that a and jaw carrier combination which, when embodied in jaw toward its carrier in a direction opposite to the direction of movement of the jaw toward workpiece gripping position, and can be detached from its carrier by pulling the jaw relative to its carrier in the direction toward its gripping position.

A more specific object is to provide a detachable jaw and jaw carrier combination which, when embodied in the conventional chuck, permits the concurrent detachment of all jaws from the carriers in a relatively simple manner as an assembly, the storage of the jaws as an assembly in proper position for reconnection concurrently of all of the jaws to their carriers, and the concurrent reattachment of all of the jaws to their respective carriers, and wherein the concurrent detachment and the concurrent reattachment can be effected by a simple operation of the chuck itself.

For the purposes of illustration, the chuck is disclosed herein as applied to an external roll-over chuck as described in my copending application, Serial No. 137,084, filed September 11, 1961, and entitled Roll-Over Chuck with indexing and preloading mechanism. As there disclosed, the chuck is one adapted to grip the exterior of a pipe coupling for holding it in position for machining.

The application of the invention to an internal chuck will be readily apparent from the illustrative example disclosed in the drawings herein, in which:

FIG. 1 is a front elevation of a chuck with the jaw and carrier combination of the present invention installed, part of the chuck being shown in section for clearness in illustration, and illustrating the manner in which the jaws can be detached and reattached as an assembly;

FIG. 2 is a horizontal sectional view through the chuck illustrated in FIG. 1, and is taken on the line 2—2 thereof;

FIG. 6 is a vertical longitudinal sectional view taken on the line 6—6 in FIG. 3;

Figure 3:
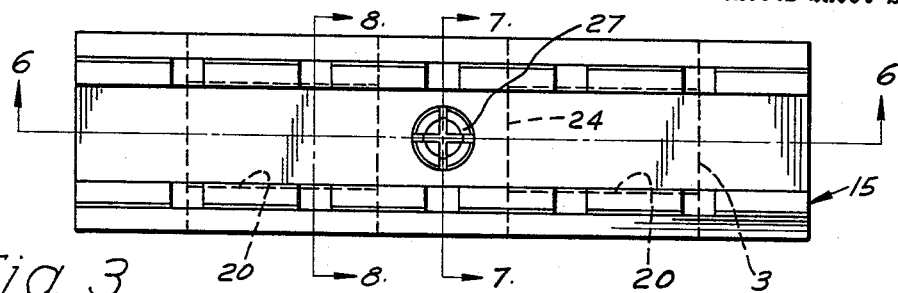
FIG. 3 is a top plan view of the chuck jaw and carrier combination embodying the principles of the present invention.
Figure 4:
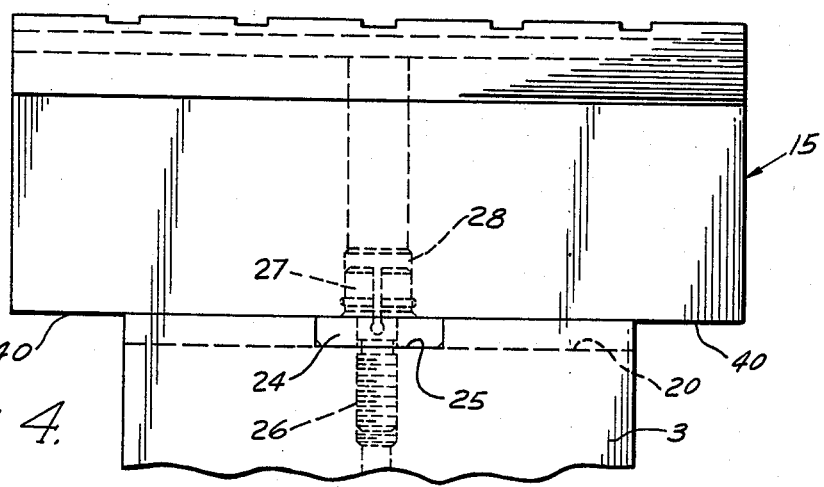
FIGS. 4 and 5 are a front elevation and a left end view, respectively, of the combination illustrated in FIG. 3.
Figure 5:
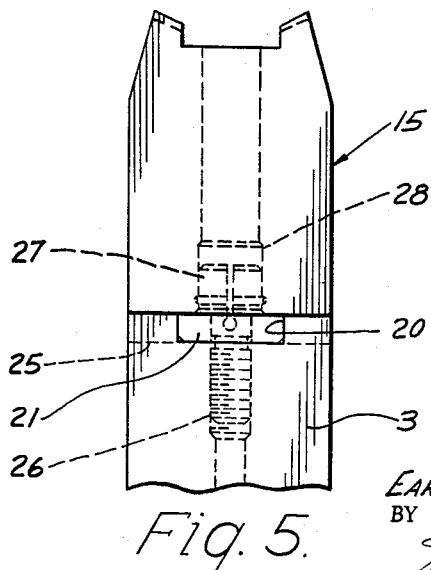
Figure 11:
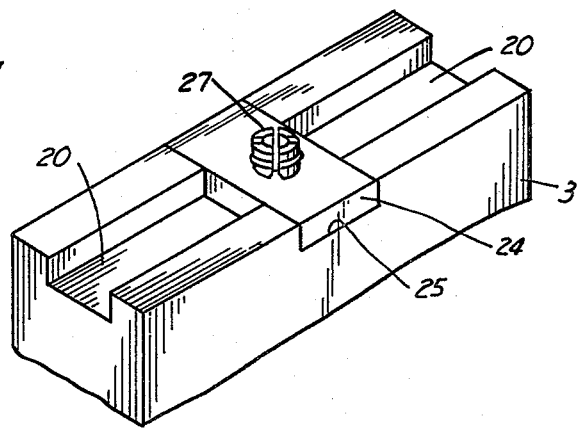
Figure 12:
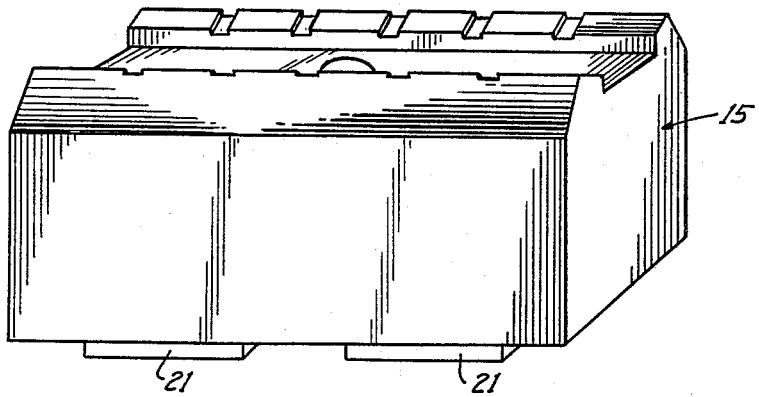
Figure 13:
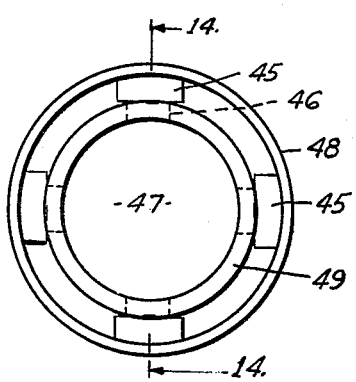
Figure 14:
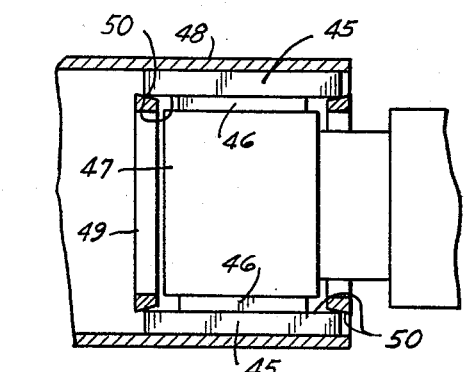

FIGS. 7 and 8 are vertical cross sectional views taken on the lines 7—7 and 8—8, respectively, in FIGS. 3 and 6;

FIG. 9 is a fragmentary cross sectional view of the jaw carrier and jaw in separated positions preparatory to attaching them to each other, and the snap fastening means therefor, part thereof being shown in section;

FIG. 10 is a top plan view of the part of the snap fastening means on the carrier, as viewed from the line 10—10 in FIG. 9;

FIG. 11 is a perspective view of a carrier showing particularly the jaw engaging face thereof;

FIG. 12 is a perspective view of a jaw showing the key portions thereof;

FIG. 13 is a diagrammatic front elevation of an internal chuck illustrating the manner in which the jaws can be removed concurrently; and FIG. 14 is a sectional view taken on the line 14—14 in FIG. 13, part thereof being shown in elevation for clearness in illustration.

Referring first to FIGS. 1 and 2, the combination is shown as embodied in a chuck indicated generally at 1, comprising a body 2 in which are mounted a plurality of jaw carriers 3. The carriers 3 are arranged about a common axis and are movable radially inwardly toward the axis for engaging the workpiece to be held by the chuck.

The body 2 is mounted on trunnions, as described in the above identified application, if it is to be a roll-over chuck.

The carriers 3 are slidably guided radially in suitable guideways 4 in the body. Return springs 5 are provided for retracting the carriers from a gripping position to a release position.

In order to move the carriers inwardly, the body 2 is provided with a suitable bore 6 and counterbore 7 in which a jaw operating ring piston 8 is provided. The ring 8 has suitable sealing washers 9, such as O-ring seals, at its ends. The body is also provided with a duct 10 through which pressure fluid may be admitted into the counterbore 7 behind the large diameter portion 11 of the ring 8 for driving the ring in a direction to move the carriers inwardly to close the chuck jaws. For closing the chuck jaws, the carriers 3 are provided with cam surfaces 12 and the ring piston 8 is provided with an annular cam surface 13 cooperable therewith. The ring piston 8 is held against displacement by rotation about the axis of the chuck by means of a suitable spring 14 held in position by a set screw 14a.

Mounted on each carrier is a suitable jaw 15 having a gripping face configured for the range of diameters of workpieces to be engaged thereby. The structure thus far briefly described is described in detail in my above identified copending application.

As mentioned therein, the chuck jaws 15 are detachably connected to their respective carriers 3. For detachably connecting a jaw to its carrier while constraining it to a proper position in a direction parallel to the axis of the chuck and circumferentially of the axis, the carrier 3 is provided with keyways 20. Preferably these keyways are portions of a single longitudinal cut. The keyways 20 are arranged to engage key portions 21 on the rear face of the jaw 15 which is to contact the outer or front face of the carrier 3. The key portions 21 fit snugly in the keyways 20, thus preventing displacement of the jaw in the direction circumferentially of the chuck axis.

In order to prevent shifting of the jaw longitudinally of the chuck axis, each carrier 3 is provided with a bridge or abutment block 24. This block is installed in a keyway 25 which extends the full width of the carrier. It is at a right angle to, and intersects, the keyway 20 midway between the ends of the keyway 20. The block 24 is fitted accurately and securely in the keyway 25 and obstructs the longitudinal cut, thus dividing it into the two keyways 20. The width of the block 24 in a direction endwise of the keyway 20 is equal to the spacing between the adjacent end edges of the keys 21. Thus when the jaw is placed with its rear face in juxtaposition with the front face of the carrier 3, the keys 21 fit the keyways 20 and engage opposite edges of the block 24, and thereby secure the jaw 15 in fixed position in the plane of the front face of the carrier 3. These keys 21 constrain the jaw from movement in any direction other than radially of the chuck.

In order to secure the jaw 15 for detachment from the carrier 3 by movement relative to the carrier in a direction radially toward the chuck axis, suitable snap fastening means are provided. In the form illustrated, the snap fastening means comprises a bolt 26 which is in threaded engagement with the carrier 3 and extends normal to the front jaw engaging face thereof. The bolt 26 has a head 27. For convenience in manufacture, the head 27 is arranged to engage the forward, outer face of the abutment block 24 to secure it firmly in the keyway 25. To effect the snap fastening arrangement, the jaw is provided with a socket 28 which is arranged to receive the head 27 of the bolt in a direction axially of the bolt and radially of the axis of the chuck.

As best illustrated in FIG. 6, both the socket and the head of the bolt are circular in cross section. The head of the bolt has a central passage 30 as a result of which the head is annular partway of its length. Longitudinal slots 31 extend radially from the outer periphery of the head through the annular wall, thus castellating the head and dividing it into a plurality of circumferentially segregated resilient sections which are resiliently movable generally toward and away from the axis of the bolt. The socket 28 has a normal internal diameter $d_1$ slightly smaller than the normal external diameter $d_2$ of the bolt head 27, for example, from about .001 to .002 of an inch smaller. The bolt head, however, has a peripheral shoulder 32 having a diameter $d_3$ which is greater than its diameter $d_2$. Correspondingly, the socket 28 has a peripheral channel 33 which opens toward the axis of the socket and which has a diameter $d_4$ which is about .005 greater than the diameter $d_3$. This channel is so positioned axially of the socket that when the rear face of the jaw is pressed against the front face of the carrier and the keys 21 are in seated position thereon, the shoulder 32 is aligned radially of the socket with the notch 33 and the edge of the shoulder nearest the base of the head of the bolt engages a peripheral margin of the channel nearest the open end of the socket, thus holding the jaw in place on its carrier, yet permitting its ready detachment.

The bolt is made of proper steel so that the sections of the head defined between the slots 31 can be flexed resiliently inwardly and outwardly radially of the bolt. By placing the jaw on the front face of the carrier 3 with the keys 21 aligned with the keyways 20, the socket is at the same time aligned with the bolt head. By pressing the jaw toward the carrier, the keys 21 enter the keyways 20 and engage opposite edges of the block 24 and at the same time the bolt head enters the socket. The bolt head is chamfered slightly at its outer end, as indicated at 34, so that, as the jaw is pressed toward the carrier, the bevelled end of the bolt engages the peripheral wall of the socket and, upon continued movement of the jaw toward the carrier, the socket wall resiliently contracts the bolt head sections toward the bolt axis so that the head moves into the socket until the shoulder 32 is in radial alignment with the channel 33. At this point, the keys 21 are fully seated in the keyways 20 and the bolt head is expanded to hold the jaw in position.

For removal, it is necessary only to pull the jaw inwardly toward the axis of the chuck away from the front face of the carrier. The channel walls are slightly curved so that, upon such a pull being exerted, they cause contraction of the bolt head so that it can slide out of the socket.

As mentioned, it is desirable that the jaws be arranged so that they can be detached concurrently and reattached concurrently as an assembly. For this purpose, the jaws 15 are made slightly longer than the carriers 3 in a direction axially of the chuck, thus providing overhanging shoulders 40 at one, or preferably both, ends. These overhanging shoulders are desirable to facilitate detachment and removal of all of the chuck jaws concurrently from their respective carriers and for reattaching them concurrently on their respective carriers. For these purposes, a suitable mandrel 41 which may be a pipe coupling, of a preselected diameter within the range of the jaw faces is placed within the group of jaws in position for gripping it in the channel in the conventional manner. The ring piston 8 is operated to cause a firm gripping relation between the jaws and the member 41. While the jaws are in gripping relation, suitable clamping rings 42 are slid over one or both of the overhanging shoulders 40 of the group of jaws. These rings preferably have internal cam surfaces 43 so that they can be forced with light pressure onto the shoulders 40 of the jaws, thus preventing the jaws from being drawn outwardly by the carriers from the tight contact with the member 41. After one or both rings are installed, the ring piston 8 is operated to cause retraction of the carriers. This retraction of the carriers unsnaps the heads of the bolts from the sockets, thus leaving the jaws assembled on the member 41 in position for reinstallation. The return means of the carriers, such as the springs 5, are adequate to pull the bolt heads out of the sockets. If desired, chains or other types of clamps may be provided for embracing the shoulders 40. It is to be noted that, in operation, the jaws do not subject the bolt heads to any strain other than the dead weight of the jaws themselves.

The jaws while remaining assembled on the mandrel 41 may be stored as an assembly. When it is desired to reattach them, they can be moved as an assembly into position so that the sockets are aligned with the heads 27, respectively. Thereupon, the ring piston 8 can be operated to move the carriers inwardly toward the chuck axis, thus engaging the bolt heads 27 with the sockets and pressing them into snap fastening engagement.

The same invention can be embodied in an internal chuck, such as illustrated in FIGS. 13 and 14. In such case, the jaws 45 are mounted on carriers 46, corresponding to the jaws 15 and carriers 3, heretofore described, except that the carriers are arranged to move outwardly radially of the axis of the chuck body 47 for gripping the work piece. In such cases, in order to remove the jaws from the chuck, the jaws are extended to grip the interior of a suitable pipe or sleeve of a pipe coupling 48. While in this position, rings 49 are engaged at inner overhanging shoulders 50 of the jaws and pressed firmly into place. These rings have external wedge surfaces so that they can be seated firmly. When in this position they may be clamped if desired against axial separation. Thereupon the carriers 46 are operated to retract toward the axis of the chuck, thus freeing themselves from the jaws 45.

It is apparent from the foregoing description that a very effective detachable jaw carrier and jaw combination is provided, the jaw being such that they can be readily attached and detached, individually or as an assembly, with respect to their carriers. The jaws can readily be stored in assembled condition, ready for instant attachmen concurrently to their carriers. The time required either for detaching the jaws or attaching them is only a fraction of the time heretofore required.

Having thus described my invention, I claim:
1. A chuck jaw carrier and detachable jaw combination comprising a jaw carrier member adapted to be mounted in a chuck for movement along a predetermined path in one direction to gripping position and in the opposite direction to releasing position, a jaw member juxtaposable against the jaw carrier member by movement relatively theretoward along said path, constraining means on the members, respectively, interengageable with each other by juxtaposition of the members and operative when interengaged to constrain the members from movement relative to each other transversely of said path, and complementary snap fastening means on the members, respectively, fully engageable in snap fastening relation with each other by movement of the members along said path relatively toward each other into juxtaposition, and operative when fully engaged to detachably secure the members together in juxtaposition.

2. The structure according to claim 1 wherein the constraining means include keys on one member and keyways on the other member snugly accommodating the keys.

3. The structure according to claim 1 wherein the snap fastening means comprise a socket in one member opening toward the other member, a snap fastening element on the other member receivable in the socket upon movement of the members toward each other along said path, and said element being resiliently contractible transversely of the path and self-restoring to normal condition when released, and said element being incapable of entering the socket when the element is in normal condition and being resiliently contractible by the socket walls upon movement of the members into juxtaposition.

4. A structure according to claim 3 wherein the socket is circular in cross section, said element comprises a bolt in threaded engagement with the other member and having a cylindrical head disposed outwardly from the other member and receivable in said socket in coaxial relation therewith, said head having an axial passage, extending axially from its outer end, and said passage being castellated from said outer end for rendering the head expansible and contractible.

5. The structure according to claim 3 wherein the socket has peripherally extending channel means in its side wall opening toward the socket axis, and the element has peripherally extending shoulder means on its side wall seatable in the channel means by the self-restoring action of the element when the shoulder means and channel means are aligned with each other radially of the socket axis.

6. The structure according to claim 5 wherein the channel means is positioned for alignment with the shoulder means and can accommodate the shoulder means only when the members are juxtaposed.

7. The structure according to claim 1 wherein the snap fastening means include means on the members, respectively, each having wall portions extending peripherally of an axis parallel to said path, the wall portion of at least one means being resiliently expansible and contractible and self-restoring to normal condition when released, the wall portions of one means being operable to be juxtaposed against those of the other only when the wall portions of the other are in a predetermined condition different from normal condition, and said wall portions of said other means being movable into said predetermined condition by coaction of the wall portions of one with those of the other upon movement of the members toward each other along said path.

8. The structure according to claim 1, wherein said constraining means include first and second keyways in said other member intersecting each other intermediate their ends, a metal abutment block in the second keyway obstructing the first keyway at the intersection, keys on the one member fitting the unobstructed portions of the first keyway, a bolt in threaded engagement with the other member and having a head bearing on, and securing the block in place, and protruding outwardly, normal to the plane of the keyways, beyond the block, said head being radially contractible and expansible and self-restoring to a normal condition, a socket in the one member adapted to prevent entry of the head when the head is in normal condition and to receive the head upon radial contraction of the head.

9. A chuck comprising a body, a plurality of jaw carriers mounted therein for concurrent movement in a direction toward and in a direction away from a common axis, a plurality of jaws, snap fastening means connecting the jaws onto the carriers, respectively, for removal from their associated carriers upon relative movement thereto in one of said directions, and means connectable to the jaws for detaching the jaws concurrently and holding them in position for concurrent reattachment.

10. The structure according to claim 9 wherein said jaws have ends at least at one end of the chuck, which overhang their associated carriers, said means comprise a rigid member gripped by the jaws at their stock gripping faces, when the carriers are moved in one of said directions, and a member engageable with all of the overhanging ends of the jaws, at least at one end of the jaws, and constraining the jaws from movement in the other direction out of gripping position upon movement of the carriers in the other of said directions, whereby when the members are in place and the carriers are moved in said opposite direction they detach themselves from the jaws.

References Cited in the file of this patent

UNITED STATES PATENTS

| 1,387,996 | Menger | Aug. 16, 1921 |
| 2,676,381 | Holmes | Apr. 27, 1954 |
| 2,896,958 | Strauss | July 28, 1959 |
| 2,982,557 | Anschutz | May 2, 1961 |

FOREIGN PATENTS

| 576,966 | Great Britain | Apr. 29, 1946 |